United States Patent
Tong et al.

(10) Patent No.: US 10,802,674 B2
(45) Date of Patent: Oct. 13, 2020

(54) METHOD AND APPARATUS FOR DISPLAYING FUNCTION INTERFACE

(71) Applicant: Alibaba Group Holding Limited, George Town (KY)

(72) Inventors: Jun Tong, Hangzhou (CN); Ding Sheng, Hangzhou (CN); Jiayin Liu, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 20 days.

(21) Appl. No.: 15/921,461

(22) Filed: Mar. 14, 2018

(65) Prior Publication Data

US 2018/0203576 A1    Jul. 19, 2018

Related U.S. Application Data

(63) Continuation of application No. PCT/CN2016/098151, filed on Sep. 6, 2016.

(30) Foreign Application Priority Data

Sep. 15, 2015 (CN) .......................... 2015 1 0587493

(51) Int. Cl.
    *G06F 3/0481*    (2013.01)
    *G06F 3/0482*    (2013.01)
    (Continued)

(52) U.S. Cl.
    CPC .......... *G06F 3/0482* (2013.01); *G06F 3/0481* (2013.01); *G06F 3/0484* (2013.01);
    (Continued)

(58) Field of Classification Search
    CPC ...... G06F 3/0482; G06F 16/951; G06F 16/24; G06F 16/3322; G06F 3/0481
    See application file for complete search history.

(56) References Cited

U.S. PATENT DOCUMENTS

2001/0044326 A1* 11/2001 Shibuya .......... H04M 1/274558
                                                                     455/566
2014/0372403 A1    12/2014 Liu et al.
(Continued)

FOREIGN PATENT DOCUMENTS

CN         101272566       9/2008
CN         101291305       10/2008
(Continued)

OTHER PUBLICATIONS

"Online shopping secured with Visa", May 14, 2006.*
(Continued)

*Primary Examiner* — Namitha Pillai
(74) *Attorney, Agent, or Firm* — Fish & Richardson P.C.

(57) ABSTRACT

A user interface is provided for display by a computing device. The user interface provides a graphical display of an application executable by the computing device. The computing device receives information provided by a user to the application through the user interface. The computing device analyzes the information provided by the user, where the analyzing includes: identifying one or more keywords of the information provided by the user; comparing the one or more keywords with a keyword library, the keyword library indicating computer-related services; based on the comparing, and identifying a particular computer-related service. The computing device provides a function interface of the particular computer-related service for display on the user interface.

20 Claims, 9 Drawing Sheets

(51) Int. Cl.
*G06F 16/245* (2019.01)
*H04M 1/725* (2006.01)
*G06F 9/451* (2018.01)
*G06F 3/0484* (2013.01)
*G06F 40/289* (2020.01)

(52) U.S. Cl.
CPC .............. *G06F 9/451* (2018.02); *G06F 9/453* (2018.02); *G06F 16/245* (2019.01); *G06F 40/289* (2020.01); *H04M 1/72522* (2013.01); *H04M 1/72552* (2013.01)

(56) References Cited

U.S. PATENT DOCUMENTS

| | | |
|---|---|---|
| 2015/0161246 A1 | 6/2015 | Liu |
| 2015/0163186 A1 | 6/2015 | Tian |
| 2016/0292967 A1* | 10/2016 | Chen .................. G06Q 20/10 |
| 2016/0345144 A1 | 11/2016 | Govindarajeswaran et al. |

FOREIGN PATENT DOCUMENTS

| | | |
|---|---|---|
| CN | 101515292 | 8/2009 |
| CN | 102866785 | 1/2013 |
| CN | 103365880 | 10/2013 |
| CN | 104142964 | 11/2014 |
| EP | 2688272 | 1/2014 |
| JP | 2002140755 | 5/2002 |
| WO | WO 2014000257 | 1/2014 |
| WO | WO 2014198132 | 12/2014 |

OTHER PUBLICATIONS

Verified by Visa, May 2011, pp. 24-47 (Year: 2011).*
Extended European Search Report in European Application No. 16845662.2, dated Aug. 1, 2018, 8 pages.
Written Opinion in Singaporean Application No. 11201801832R, dated Nov. 15, 2018, 6 pages.
International Search Report issued by the International Searching Authority in International Application No. PCT/CN2016/098151 dated Dec. 9, 2016; 9 pages.
Never Blog [online]. "Kakaopay mobile payment is simple and convenient," Apr. 2015, retrieved on Nov. 20, 2019, retrieved from URL<http://bigstonepr.net/220338009259>, 29 pages (with English translation).

* cited by examiner

METHOD AND APPARATUS FOR DISPLAYING FUNCTION INTERFACE

This application is a continuation of PCT Application No. PCT/CN2016/098151, filed on Sep. 6, 2016, which claims priority to Chinese Patent Application No. 201510587493.8, filed on Sep. 15, 2015, and each application is hereby incorporated by reference in its entirety.

TECHNICAL FIELD

The present application relates to the field of computer technologies, and in particular, to a method and an apparatus for displaying a function interface.

BACKGROUND ART

With the continuous development of network technologies, service providers provide increasingly diversified services for users based on social platforms such as instant messaging and WEIBO. For example, picture sharing, location sharing, and the like are provided for users based on social platforms. Moreover, these services have become an indispensable part of people's lives.

At present, during chatting and interaction on a social platform, a user may generally use a service provided by a service provider based on the social platform. For example, the user uses a location sharing service, that is, the user can share his/her geographic location with other users.

SUMMARY

Embodiments of the present application provide a method and an apparatus for displaying a function interface to solve the problem in the prior art that operations are inconvenient when a user uses a service provided by a social platform.

A method for displaying a function interface provided in an embodiment of the present application includes: receiving information input by a user; determining a keyword in the information; and displaying a function interface corresponding to the keyword according to a preset correspondence between keywords and function interfaces.

An apparatus for displaying a function interface provided in an embodiment of the present application includes: a receiving module configured to receive information input by a user; a determining module configured to determine a keyword in the information; and a display module configured to display a function interface corresponding to the keyword according to a preset correspondence between keywords and function interfaces.

The embodiments of the present application provide a method and an apparatus for displaying a function interface. In the method, a terminal can receive information input by a user, determine a keyword in the information, and display a function interface corresponding to the keyword according to a preset correspondence between keywords and function interfaces. By means of the method, when using a service provided by social platforms such as instant messaging and WEIBO, the user does not need to operate multiple times on an application client terminal to enable a function interface corresponding to the service. The terminal can automatically determine, according to information input by the user, a keyword in the information and display a function interface corresponding to the keyword (that is, the function interface corresponding to the service) to the user, such that the number of user operations is effectively reduced and the operation is more convenient for the user.

BRIEF DESCRIPTION OF THE DRAWINGS

The accompanying drawings described here are used to provide a further understanding of the present application, and form a part of the present application. Exemplary embodiments of the present application and description of the embodiments are merely used to explain the present application, and do not constitute any improper limitation on the present application. In the accompanying drawings.

DETAILED DESCRIPTION

To make the objectives, technical solutions and advantages of the present application more apparent, technical solutions of the present application are described clearly and completely below with reference to specific embodiments of the present application and the corresponding accompanying drawings. The described embodiments are merely some, rather than all, of the embodiments of the present application. Based on the embodiments of the present application, all other embodiments derived by a person of ordinary skill in the art without any creative effort shall fall within the protection scope of the present application.

Figure 1A:
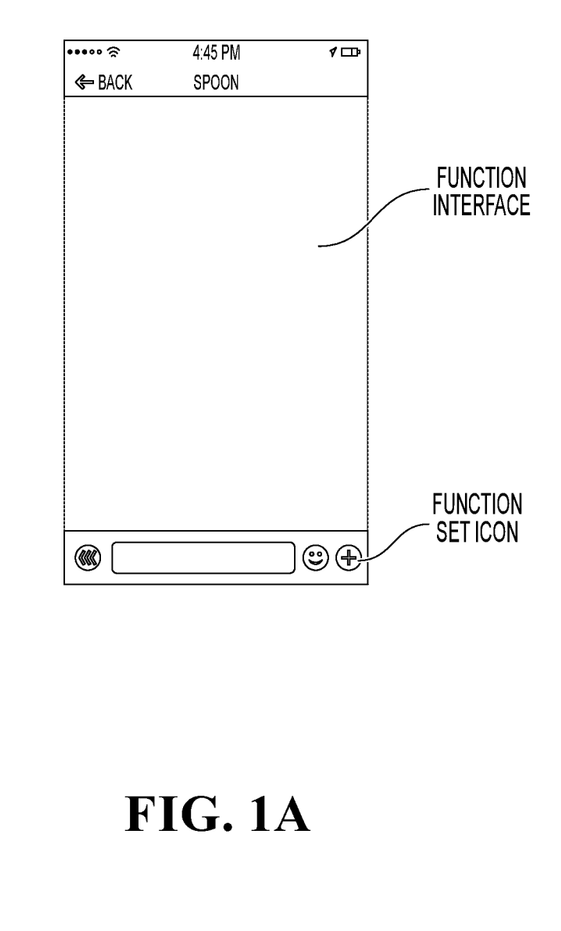
FIG. 1A is a schematic diagram of a function interface including a function set icon according to the prior art.
Figure 1B:
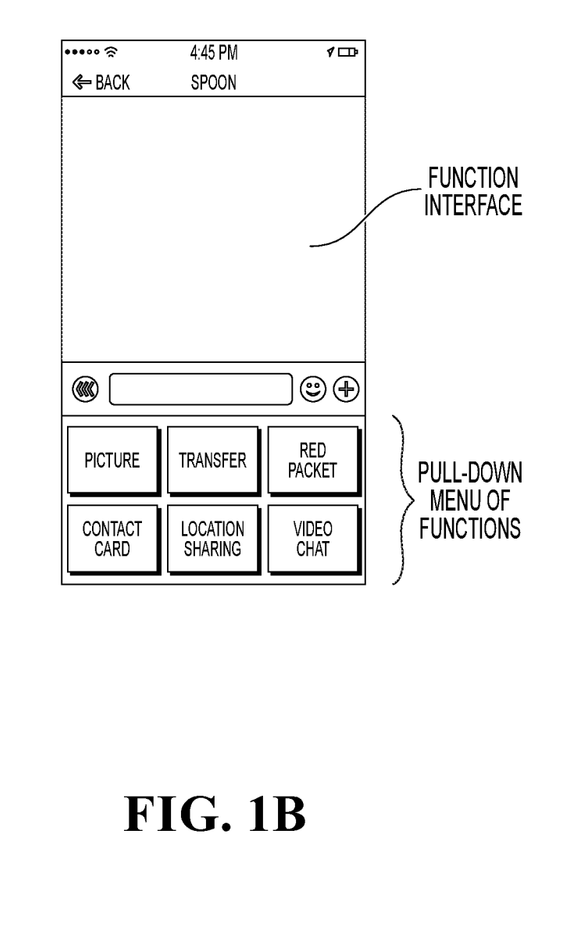
FIG. 1B is a schematic diagram of a function interface including a pull-down menu of functions according to the prior art.

FIG. 1A is a schematic diagram of a function interface including a function set icon according to the prior art. FIG. 1B is a schematic diagram of a function interface including a pull-down menu of functions according to the prior art. As shown in FIG. 1A and FIG. 1B, when using a location sharing service in the prior art, a user first needs to click a function set icon on a function interface (as shown in FIG. 1A). The operation of clicking the function set icon by a terminal user can trigger a pull-down menu of functions (as shown in FIG. 1B) to pop up. The user can find a location sharing icon in the pull-down menu of functions and click the icon. The terminal can send location information of the user to another user according to the operation of clicking the location sharing icon by the user.

It can be seen from FIG. 1A and FIG. 1B that when using the service provided by the social platform, the user needs to operate multiple times to find and click the icon corresponding to the required service. The operations are inconvenient.

Figure 2:
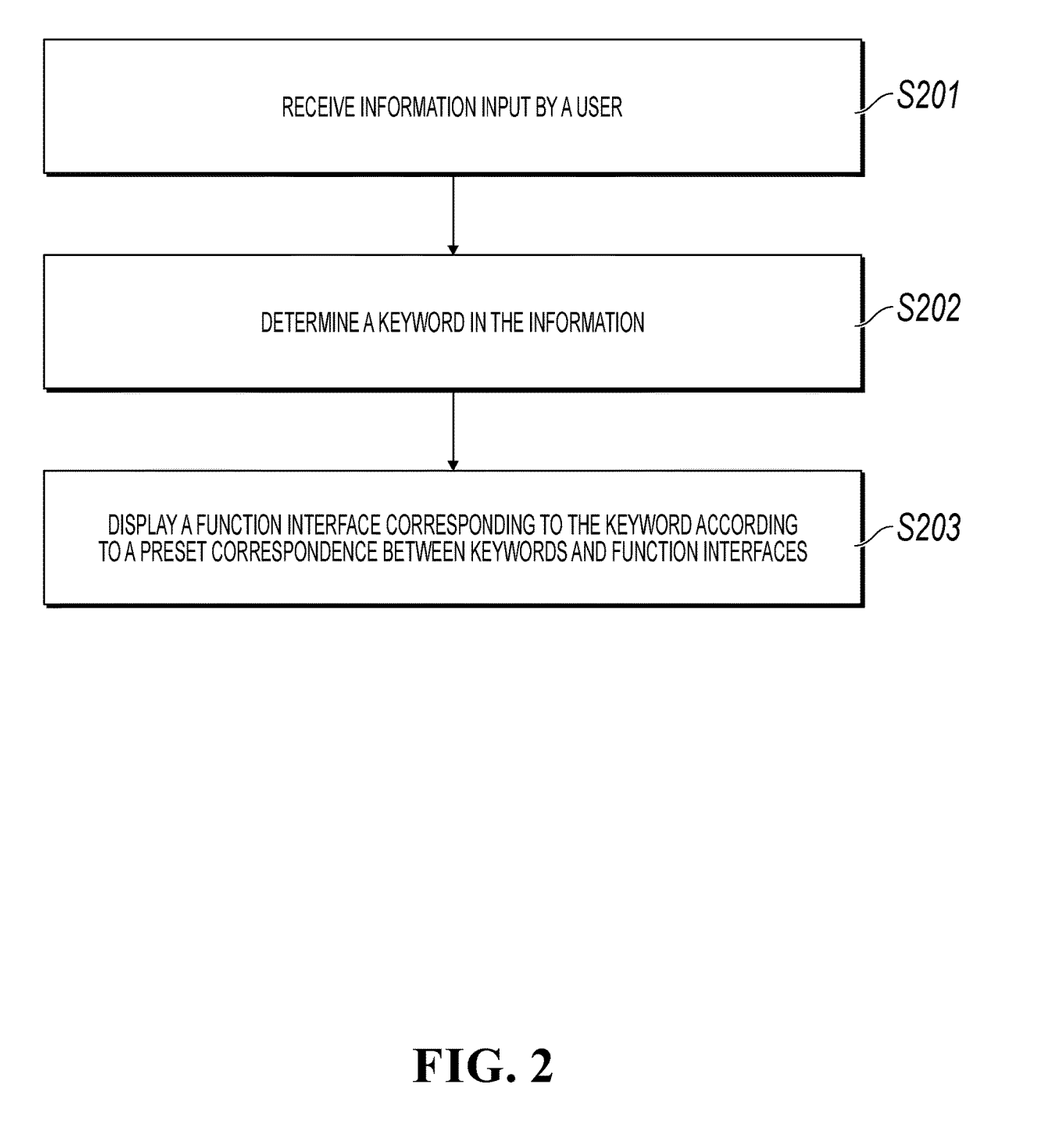
FIG. 2 shows a process of displaying a function interface according to an embodiment of the present application.

FIG. 2 shows a process of displaying a function interface according to an embodiment of the present application, which specifically includes the following steps:

S201: Information input by a user is received.

In an embodiment of the present application, a terminal can first receive information input by a user. Here, the terminal may be a mobile terminal such as a mobile phone or a tablet, and may also be a Personal Computer (PC) and the like. When using a terminal, a user generally uses services provided by applications installed on the terminal. At present, services provided by applications are increasingly diversified. In other words, when providing a major service for the user, an application can also provide other services for the user. For example, an instant messaging application can provide a payment service for the user while providing a chat service for the user. Therefore, the user may use multiple services in an application. In addition, the user generally will input information when using the service provided by the application installed on the terminal. For example, the user will input an instant messaging message in a chat function interface when using a chat service on an instant messaging client terminal. That is, the terminal may specifically receive information from the user via the application client terminal. Therefore, the terminal of the present application can determine, according to the information input by the user, services that the user intends to use, and display corresponding function interfaces. The function interface described in the present application can refer to an interface that can implement a specific function, for example, an interface implementing a function such as transfer or music sharing. In other words, the user may use a corresponding function by means of a function interface.

For example, after logging onto an instant messaging client terminal, a user Zhang San uses a chat service provided by an instant messaging application. During chatting with a friend, Zhang San inputs "I have a good song to share with you" in a chat function interface if he wants to share his favorite music with the friend (that is to say, Zhang San needs to use a music sharing service in instant messaging software). Upon receiving the instant messaging message, the terminal can determine the user intention according to subsequent steps and display a corresponding function interface.

S202: A keyword in the information is determined.

In an embodiment of the present application, when the terminal determines the user intention according to the information input by the user, a keyword library may be established in advance for convenience since the information input by the user may be relatively long. The terminal may then determine a keyword included in the information input by the user, and determine the user intention according to the determined keyword in the information.

The keyword may be a keyword related to a geographic location, such as "location" and "longitude and latitude". These keywords may indicate that the user intends to use a service related to a geographic location, such as navigation and location sharing. The keyword may also be a music-related keyword such as "music" and "song". These keywords may indicate that the user intends to use a music-related service, such as music sharing. The keyword may also be a keyword of another type. Each keyword can indicate that the user intends to use a service related to an application function. The same keyword corresponds to the same service. For example, a keyword "location" corresponds to a location sharing service in the terminal. Different keywords may correspond to the same service or different services. For example, both "location" and "longitude and latitude" correspond to the location sharing service in the terminal, while "music" corresponds to a song sharing service in the terminal, which is different from the service corresponding to "location".

By using the above example again, it is assumed that "song" is used as a keyword and is stored in the keyword library in advance. Upon receiving "I have a good song to share with you" input by the user, the terminal can determine that a keyword in the instant messaging message is "song".

S203: A function interface corresponding to the keyword is displayed according to a preset correspondence between keywords and function interfaces.

In an embodiment of the present application, content related to a service can be displayed in the function interface. Each service corresponds to one function interface, and different services correspond to different function interfaces. For example, the location sharing service corresponds to one function interface on which content related to the location sharing service is displayed, while the music sharing service corresponds to another function interface on which content related to the music sharing service is displayed.

In order to display a function interface corresponding to a determined keyword to the user according to the keyword, a correspondence between keywords and function interfaces may be preset according to the practical situation. In other words, a function interface corresponding to each keyword can be preset. For example, the keywords "location" and "longitude and latitude" both correspond to the location sharing function interface, while the keywords "music" and "song" both correspond to the music sharing function interface. After the terminal displays the function interface corresponding to the keyword to the user according to the correspondence between keywords and function interfaces, the user may determine, according to his/her actual requirement, whether to use the service. If yes, the user may operate correspondingly on the function interface displayed by the terminal. If no, the user may directly click a close button to close the function interface.

Figure 3:
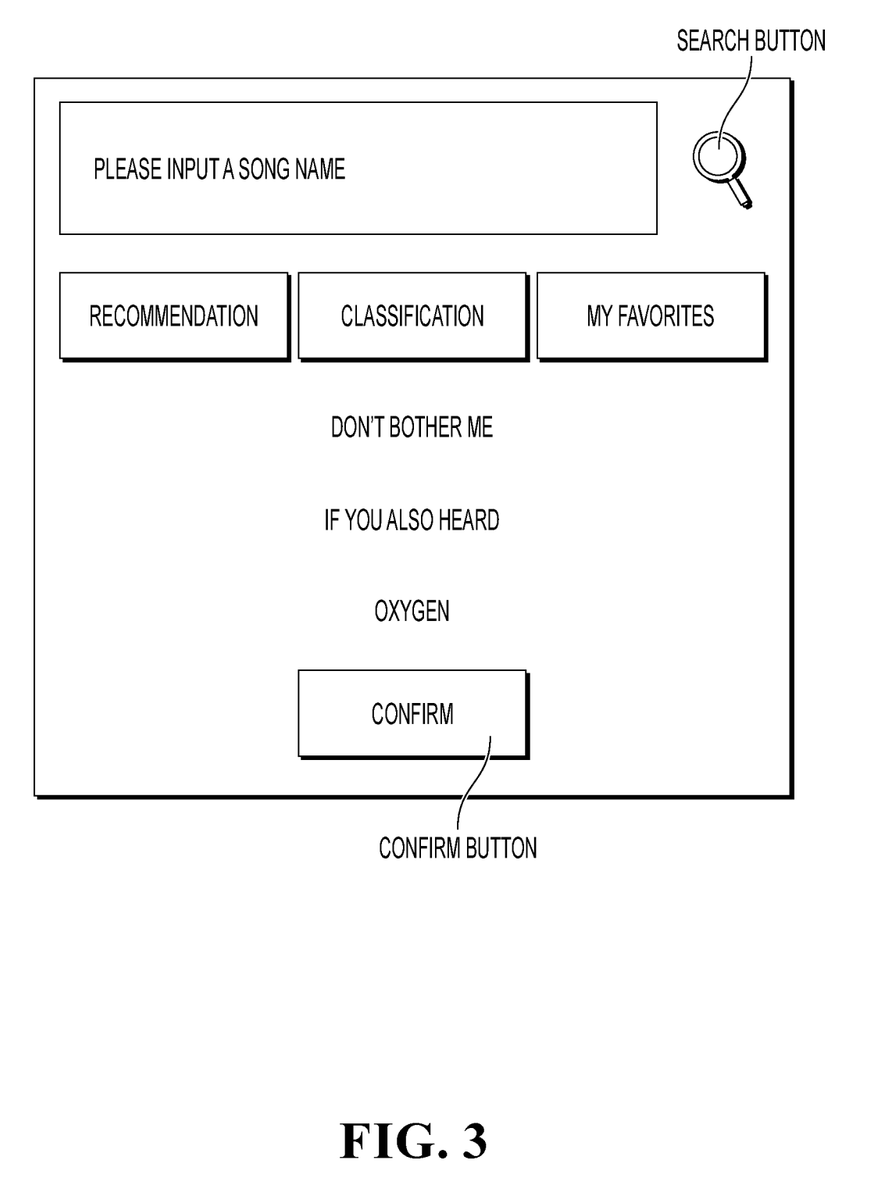
FIG. 3 is a schematic diagram of a music sharing function interface according to an embodiment of the present application.

By using the above example again, it is assumed that the music sharing function interface corresponding to the preset keyword "song" is as shown in FIG. 3. After determining the keyword "song" in "I have a good song to share with you", the terminal can display the music sharing function interface as shown in FIG. 3 to the user Zhang San. If the user Zhang San needs to use the music sharing service, he may input a corresponding song in the music sharing function interface as shown in FIG. 3, and click an OK button in the function interface. The terminal then can send the corresponding song to the friend.

By means of the above method, when using the music sharing service provided by the instant messaging application, the user Zhang San does not need to provide multiple interactions to enable a music sharing function interface. The terminal can automatically determine, according to the input "I have a good song to share with you" that the keyword in the information is "song", and display the music sharing function interface corresponding to "song" to the user. The user Zhang San operates with the music sharing function interface according to his/her need. As such, the number of user operations is effectively reduced and the operation is more convenient.

It should be noted here that, in an actual application, the terminal may implement the method for displaying a function interface as shown in FIG. 1A by use of an installed application. Here, the application installed on the terminal may be an instant messaging application, and when the user uses the instant messaging application, the information input by the user may be an instant messaging message.

After determining the keyword in the information input by the user, the terminal can automatically display the function interface corresponding to the keyword to the user according to the determined keyword. In addition, the terminal may also display the function interface corresponding to the keyword according to a designated operation by the user on the keyword, so as to avoid display of excessive function interfaces when the information input by the user includes excessive keywords. Specifically, when displaying the function interface corresponding to the keyword after determining the keyword included in the information input by the user, the terminal may receive a designated operation by the user on the keyword, and then trigger display of the function interface corresponding to the keyword according to the designated operation. The designated operation may include at least one of a click operation and a long-press operation. The designated operation may also be an operation of another type.

Further, after determining the keyword in the information, the terminal may perform particular processing on the determined keyword to distinguish the keyword from non-keywords, so as to help the user clearly know which one in the information is a keyword and then perform a designated operation on the keyword. Specifically, the terminal may highlight the determined keyword, or mark the keyword by using a preset background color.

Figure 4:
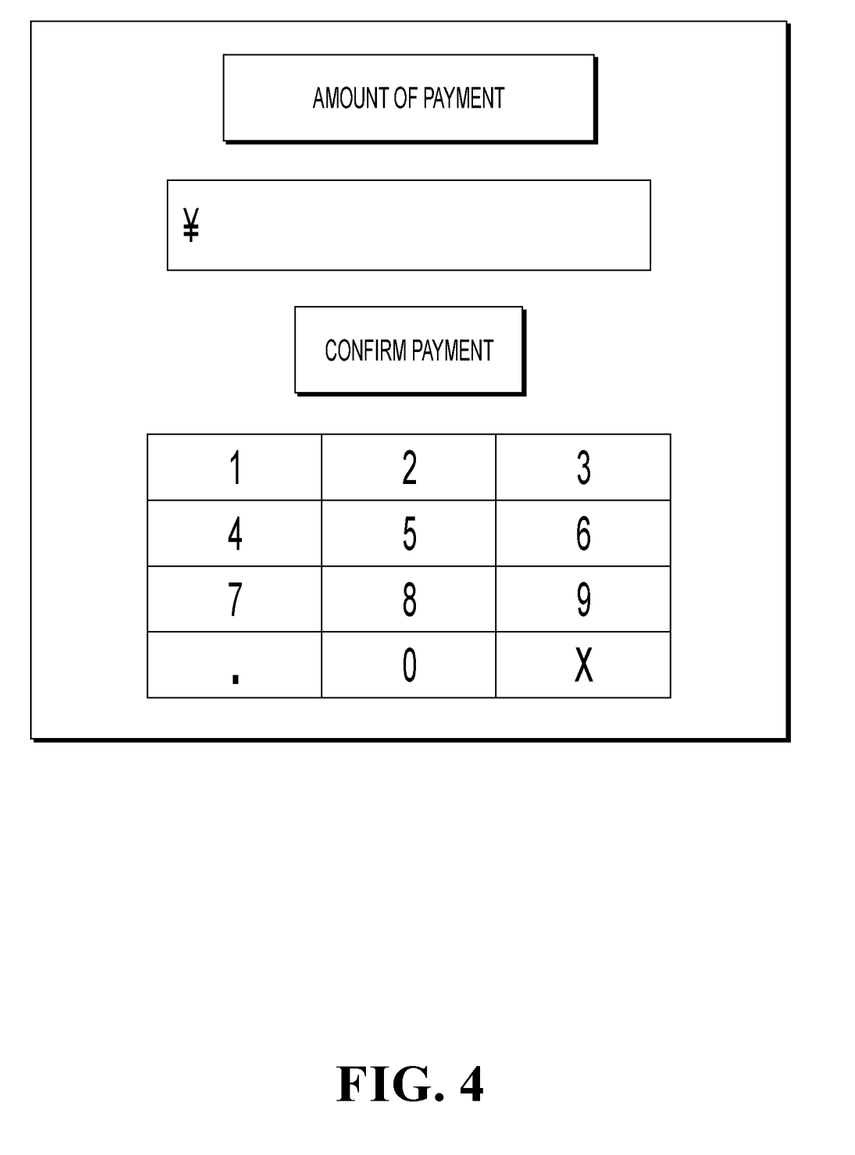
FIG. 4 is a schematic diagram of a payment function interface corresponding to a keyword related to a payment service according to an embodiment of the present application.

For example, it is assumed that "pay" is used as a keyword and stored in the keyword library in advance. The user Zhang San can log onto an instant messaging client terminal and chat with a friend in a chat function interface. It is assumed that the terminal receives an instant messaging message "I haven't paid 100 yuan yet for your work this morning" sent by Zhang San to the friend, determines that a keyword in the instant messaging message is "pay", and highlights the word "pay". After noting the highlighted word "pay", Zhang San can directly click the keyword "pay" (i.e., perform a designated operation on the keyword "pay"). Upon receiving the click operation by the user Zhang San on the keyword "pay", the terminal then can display a payment function interface corresponding to the keyword "pay" to the user Zhang San. The displayed payment function interface is shown in FIG. 4.

The method for displaying a function interface according to the present application is described in detail in the following by using the terminal displaying the payment function interface according to the keyword included in the information input by the user as an example.

In an embodiment of the present application, a keyword related to a payment service may be preset, that is, the keyword may include a preset keyword related to a payment service. If a user intends to use a payment service, information input by the user generally includes a numeric-type character or a character of another particular type. Therefore, the keyword may further include a preset designated-type character. The designated-type character may include a numeric-type character, and may also include a character such as "¥" and "$".

To make the operation more convenient for the user, when the keyword is a preset keyword related to a payment service (such as "payment", "transfer", and "AA"), after receiving the information input by the user, determining that the information includes the payment service-related keyword, and displaying a payment function interface, the terminal may further automatically extract a numeric character in the information, and add the extracted numeric character to the payment function interface. Specifically, the terminal may add the numerical character to a designated region in the payment function interface, and then process payment service data according to the numeric character added to the payment function interface. After the numeric character is added to the payment function interface and before the payment service data is processed, the payment function interface to which the numeric character has been added may be displayed to the user to prompt the user to confirm the payment. After confirming that the payment amount is correct, the user may click an OK button. If finding that the amount displayed on the payment function interface is incorrect, the user may manually modify the amount, and click the OK button. Upon receiving the click operation by the user, the terminal can process payment service data according to the numeric character in the payment function interface.

Figure 5:
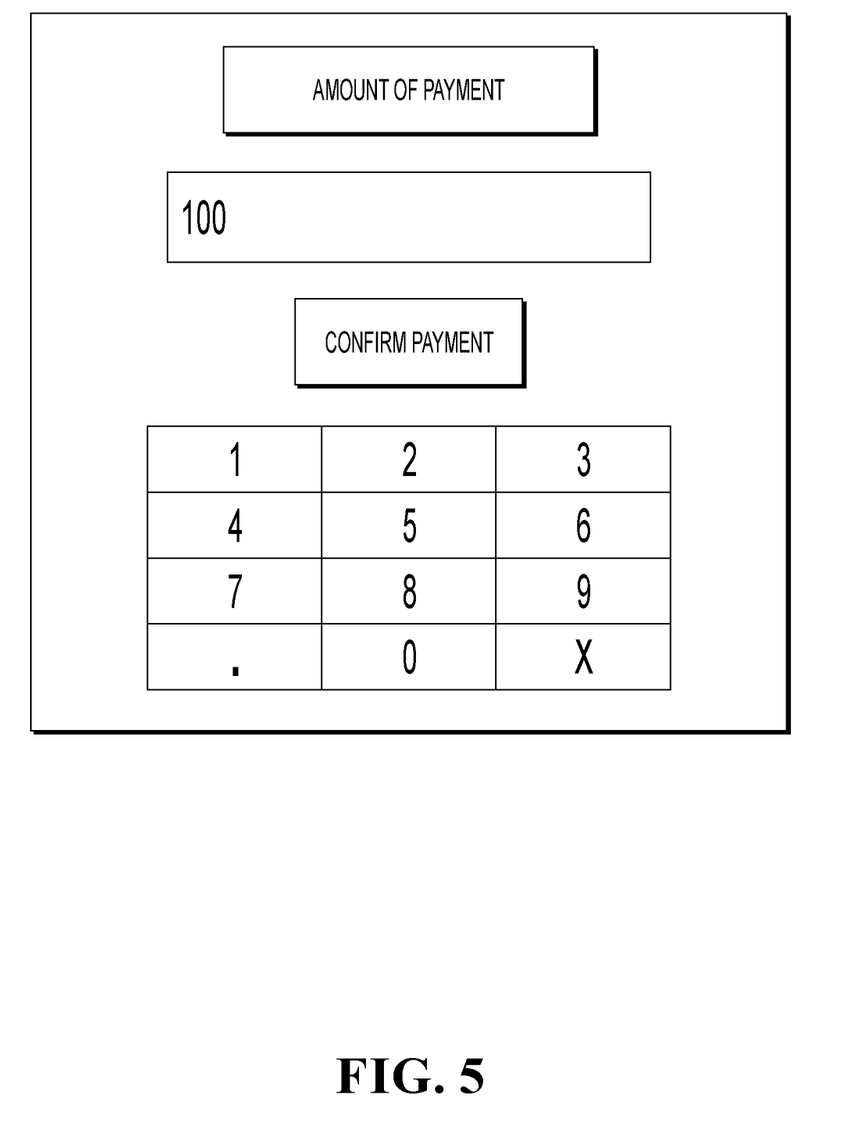
FIG. 5 is a schematic diagram of a payment function interface after a numeric character is added according to an embodiment of the present application.

For example, it is assumed that "pay", "transfer", and "AA" are used as keywords and are stored in the keyword library in advance, and it is set that the three keywords all correspond to the payment function interface as shown in FIG. 4. The user Zhang San may log onto an instant messaging client terminal to chat with a friend, and remember that he needs to pay 100 yuan to the friend during chatting. Therefore, Zhang San may input "I haven't paid 100 yuan to you yet for the meal this morning" in the chat function interface. Upon receiving the message input by Zhang San, the terminal can determine that a keyword in the instant messaging message is "pay", extract a numeric character "100" in the instant messaging message, add "100" to a payment amount input field (i.e., a designated region) in the payment function interface, and display the payment function interface to which "100" has been added (as shown in FIG. 5) to the user Zhang San. After confirming that the payment amount is correct, Zhang San may click an OK button. The terminal then may process payment service data according to the added numeric character "100", i.e., transfer 100 yuan from an account of Zhang San to his friend.

It should be noted here that when there is no numeric character or there are multiple numeric characters in the information including the keyword, the terminal may not add any numeric character to the designated region in the function interface corresponding to the keyword. The user may manually add the needed amount to the designated region in the function interface, and click the OK button. In addition, when there are multiple numeric characters in the information including the keyword, the terminal may also randomly add one numeric character to the designated region in the function interface corresponding to the keyword, and add all remaining characters in the information to a pull-down menu corresponding to the designated region. The user may click the numeric character when finding that the numeric character in the designated region is incorrect. The terminal then may display the pull-down menu corresponding to the designated region to the user, and the user may select a correct numeric character by himself/herself.

Figure 6:
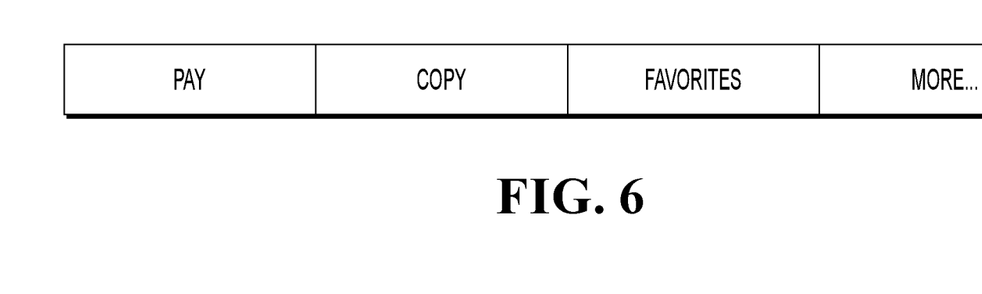
FIG. 6 is a schematic diagram of a payment function interface corresponding to a numeric character as a keyword according to an embodiment of the present application.
Figure 7:
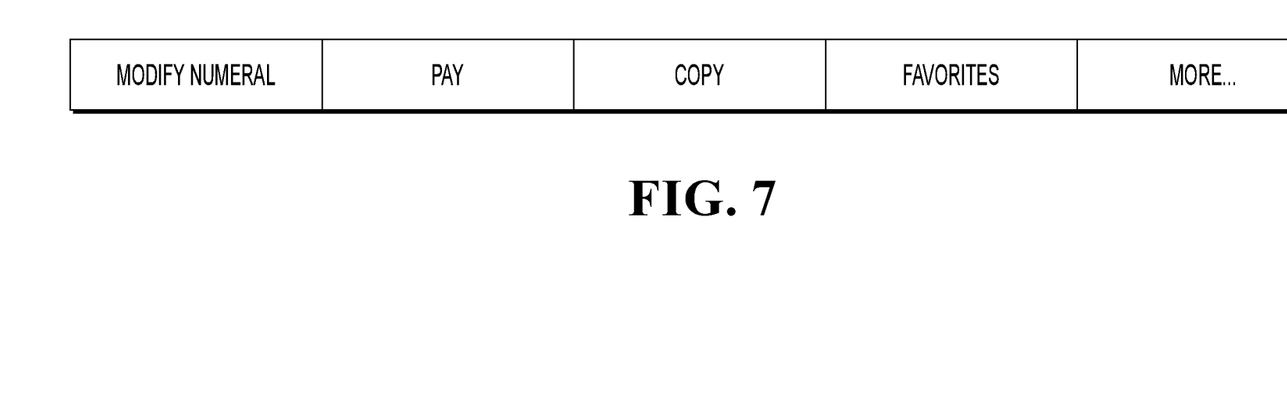
FIG. 7 is a schematic diagram of another payment function interface corresponding to a numeric character as a keyword according to an embodiment of the present application.

In addition, when the keyword is a numeric character, upon receiving the information input by the user, the terminal will determine the numeric character in the information, and display the payment function interface as shown in FIG. 6. If the user needs to use the payment service provided by the terminal, he/she may first confirm whether the numeric character is a correct amount needed. If yes, the user may click a payment button in the payment function interface. If no, the user may manually close the payment function interface, and input new information including a correct numeric character. Upon receiving the information input by the user, the terminal will display the payment function interface as shown in FIG. 6 to the user. The user only needs to click the payment button in the payment function interface. A numeral modifying function button (as shown in FIG. 7) may further be added in the payment function interface as shown in FIG. 6. The user may modify the numeric character by clicking the numeral modifying button. That is, the terminal may display the function interface as shown in FIG. 4 to the user when receiving his/her operation of clicking the numeral modifying button. The user can then add a correct numeric character and click to confirm the payment.

Figure 8:
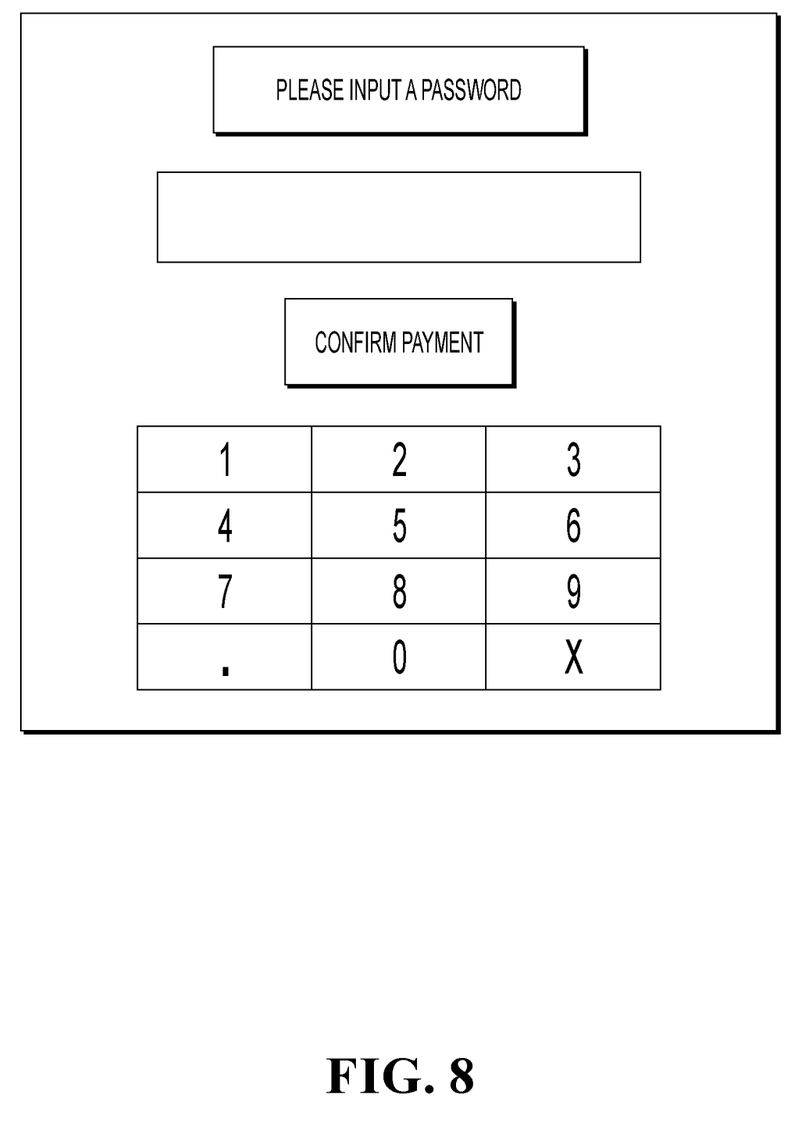
FIG. 8 is a schematic diagram of a payment password input function interface according to an embodiment of the present application.

In an actual application, after the terminal displays the payment function interface, since the user may click the payment button by mistake, a threshold may be preset. The terminal can compare the numeric character with the threshold before processing the payment data according to the numeric character. If the numeric character exceeds the threshold, a password input function interface as shown in FIG. 8 may be displayed to the user. If the numeric character does not exceed the threshold, the payment data may be processed directly according to the numeric character. As such, the loss can be limited within the threshold even if user error occurs. Specifically, after the user clicks the payment button, the terminal may determine whether the numeric character is greater than the preset threshold. If yes, the terminal can display the payment password input function interface as shown in FIG. 8 to the user, and prompt the user to input a payment password. The user then can input the payment password, and the terminal can receive the payment password input by the user and authenticate it. After the password succeeds in the authentication, the terminal can process the payment data according to the numeric character. If the numeric character is not greater than the preset threshold, the terminal may process the payment data directly according to the numeric character.

By using the above example again, it is assumed that all numeric characters are used as keywords and are stored in the keyword library in advance. In addition, it is preset that the numeric characters correspond to the payment function interface as shown in FIG. 6, and the preset threshold is "50". In the above example, upon receiving "I haven't paid 100 yuan to you yet for the meal this morning" input by Zhang San, the terminal can determine that the numeric character in the instant messaging message is "100", and display the payment function interface (as shown in FIG. 6) corresponding to "100" to Zhang San. Zhang San will confirm that the numeric character "100" is a correct payment amount, and click the payment button in the payment function interface. Upon receiving the operation of clicking for payment by Zhang San, the terminal can determine that "100" is greater than "50", then display the password input function interface as shown in FIG. 8 to Zhang San, and prompt him/her to input a payment password. Zhang San then can input the payment password 123456. Upon receiving the payment password of Zhang San, the terminal can verify whether it is correct. If yes, the terminal can process the payment service data according to "100", that is, transfer 100 yuan from an account of Zhang San to his friend. If no, the terminal may prompt the user that the password is incorrect, such that the user may input a password again.

The method for displaying a function interface according to the embodiment of the present application is described in the foregoing. Based on the same idea, an embodiment of the present application further provides an apparatus for displaying a function interface, as shown in FIG. 9.

Figure 9:
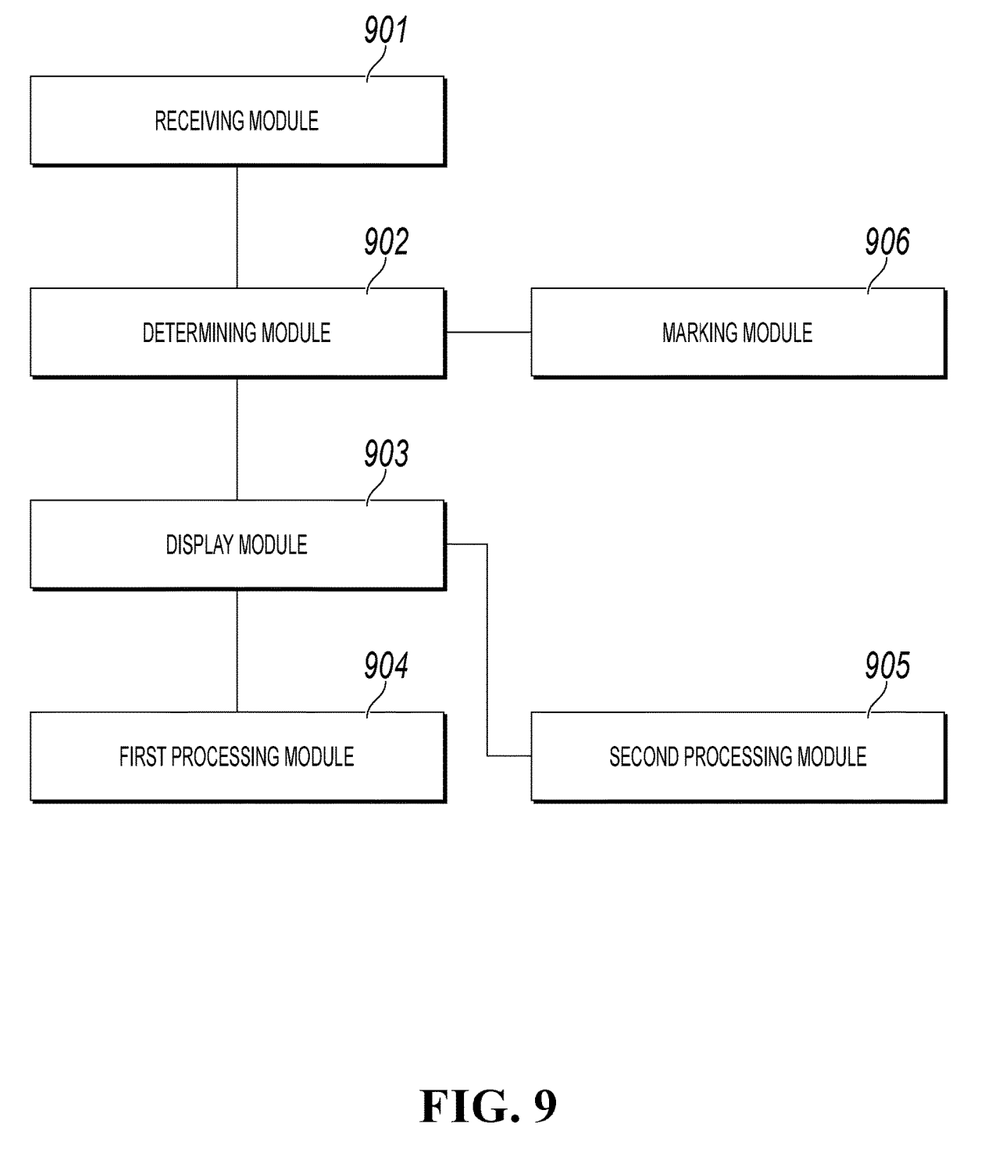
FIG. 9 is a schematic structural diagram of an apparatus for displaying a function interface according to an embodiment of the present application.

FIG. 9 is a schematic structural diagram of an apparatus for displaying a function interface according to an embodiment of the present application. The apparatus includes: a receiving module 901 configured to receive information input by a user; a determining module 902 configured to determine a keyword in the information; and a display module 903 configured to display a function interface corresponding to the keyword according to a preset correspondence between keywords and function interfaces.

The information includes an instant messaging message from the user.

The display module 903 is specifically configured to receive a designated operation by the user on the keyword; and trigger, according to the designated operation, display of the function interface corresponding to the keyword. The designated operation includes at least one of a click operation and a long-press operation. The keyword includes a preset keyword related to a payment service or a preset designated-type character, and the designated-type character is a numeric-type character.

The apparatus further includes: a first processing module 904 configured to, when the keyword is a preset keyword related to a payment service, extract a numeric character in the information; add the numeric character to a designated region in the function interface; and process payment service data according to the numeric character added in the function interface.

The apparatus further includes: a second processing module 905 configured to, when the keyword is a numeric character, determine whether the numeric character is greater than a preset threshold; and if yes, receive a password input by the user, and process payment service data according to the numeric character after the password succeeds in authentication; or if no, process payment service data according to the numeric character.

The apparatus further includes: a marking module 906 configured to, before the display module 903 displays a function interface corresponding to the keyword, highlight the determined keyword, or mark the keyword by using a preset background color.

In a typical configuration, a computing device includes one or more processors (CPU), an input/output interface, a network interface, and a memory. The memory may include a computer readable medium including a volatile memory, a random access memory (RAM) and/or a non-volatile memory or the like, for example, a read-only memory (ROM) or a flash RAM. The memory is an example of the computer readable medium.

The computer readable medium includes non-volatile and volatile media as well as movable and non-movable media, and can implement information storage by means of any method or technology. Information may be a computer readable instruction, a data structure, and a program module or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition therein, the computer readable medium does not include transitory media, such as a modulated data signal and a carrier.

It should be further noted that the term "include", "comprise" or any other variations thereof are intended to cover non-exclusive inclusion, so that a process, method, commodity or device including a series of elements not only includes the elements, but also includes other elements not clearly listed, or further includes inherent elements of the process, method, commodity or device. Without any more limitations, an element defined by "including a/an . . . " does not exclude that the process, method, commodity or device including the element further has additional identical elements.

Those skilled in the art should understand that the embodiments of the present application may be provided as a method, a system, or a computer program product. Therefore, the present application may be implemented as a complete hardware embodiment, a complete software embodiment, or an embodiment combining software and hardware. Moreover, the present application may be in the form of a computer program product implemented on one or more computer usable storage media (including, but not limited to, a magnetic disk memory, a CD-ROM, an optical memory and the like) including computer usable program codes.

The above description is merely embodiments of the present application, and is not intended to limit the present application. For those skilled in the art, the present application may have various modifications and variations. Any modification, equivalent replacement, improvement or the like made without departing from the spirit and principle of the present application should all fall within the scope of claims of the present application.

Figure 10:
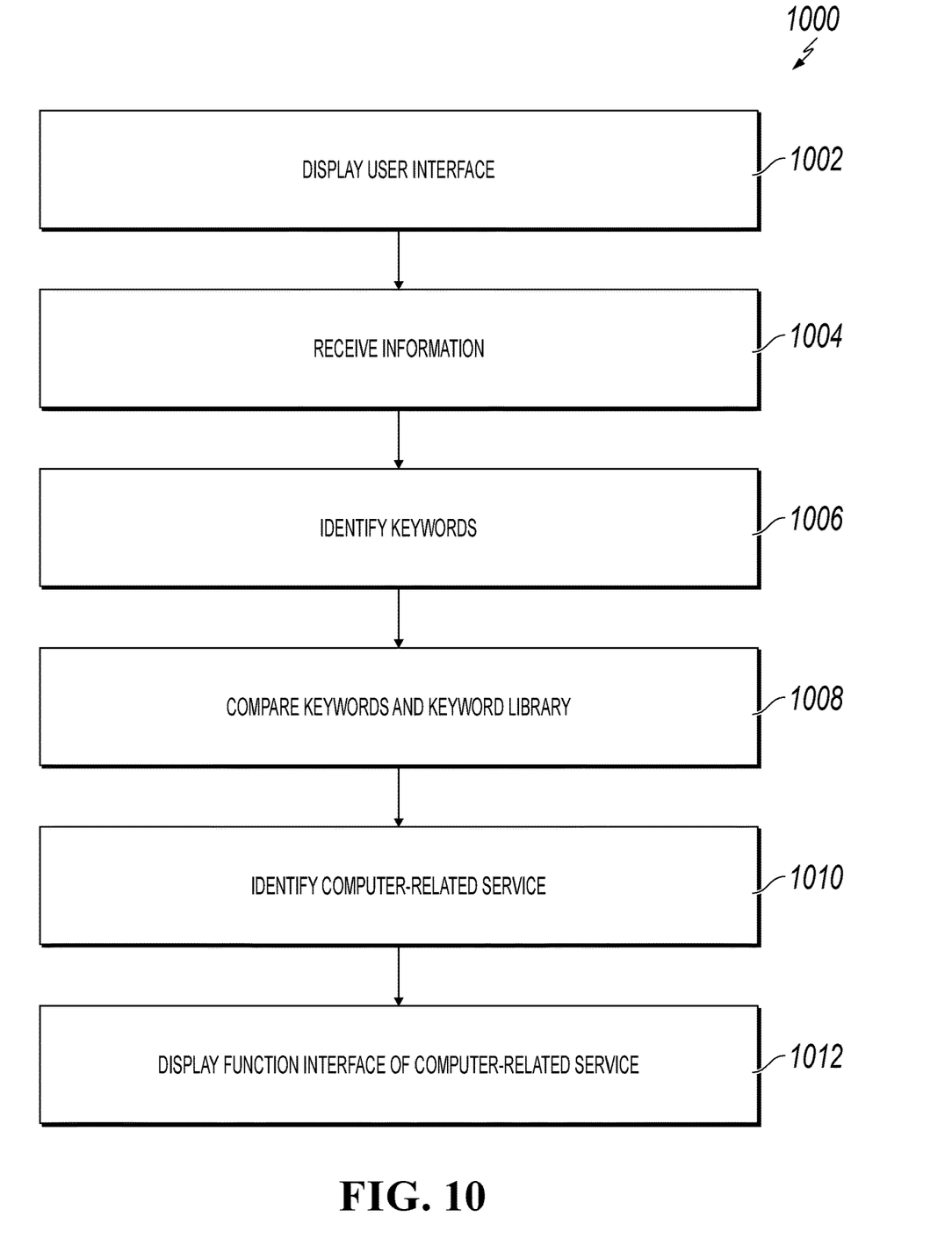
FIG. 10 is a flow chart illustrating an example method of displaying a function interface according to the present disclosure.

FIG. 10 depicts a flowchart of an example process 1000 for displaying a function interface according to the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order. The example process 1000 can be executed using one or more computing devices.

At 1002, a user interface is provided for display. In some implementations, the user interface provides a graphical display of an application executable by the computing device. In some implementations, the application can include a chat-interface (for example, a message application), and the information provided by the user can include textual data. From 1002, method 1000 proceeds to 1004.

At 1004, information is received that is provided by a user to the application through the user interface. From 1004, method 1000 proceeds to 1006.

At 1006, the received information is analyzed by identifying one or more keywords of the information provided by the user. From 1006, method 1000 proceeds to 1008.

At 1008, information is analyzed by comparing the one or more keywords with a keyword library. The keyword library indicates computer-related services. From 1008, method 1000 proceeds to 1010.

At 1010, a particular computer-related service is identified, based on the comparing. In some implementations, analyzing the information can also include applying a distinguishing feature (such as, highlighting or bolding) to the one or more keywords for display by the application through the user interface. In some implementations, in response to applying the distinguishing feature, user selection of the one or more keywords is received to indicate the particular computer-related service. From 1010, method 1000 proceeds to 1012.

At 1012, a function interface of the particular computer-related service is provided for display on the user interface. In some implementations, the one or more keywords are inserted into the function interface. In some implementations, after providing the function interface of the particular computer-related service for display on the user interface, an input signal is received indicating whether the function interface matches the information provided by the user. After 1012, method 1000 stops.

Particular implementations of the subject matter described in this specification can be implemented so as to realize one or more of the following advantages. For example, implementations of the subject matter provide for the efficient usage of computer resources (for example, processing cycles, memory usage, etc.). Specifically, a user can access multiple computer-related services such as messaging applications, payment applications, and music applications provided by a computing device (for example, a smartphone). To facilitate switching between the services while the user is currently engaged with one of the services can be computationally expensive. For example, to provide a streamlined transition process and display of a streamlined switching between the services can be computer resource intensive. To efficiently leverage computer resources, switching between the services is facilitated by determining keywords provided by the user, and automatically identifying a desirable service for switching to. These actions minimize or prevent waste of available computer resources by preventing an incorrect computer-related service(s) from being launched. Stated in another way, the described methodology minimizes use of available computer resources by ensuring the launch of a particular computer-related service(s) that corresponds to the provided keywords.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   providing, by a computing device, a user interface for display, the user interface providing a graphical display of an application executable by the computing device;
   receiving, by the computing device, information provided by a user to the application through the user interface;
   analyzing, by the computing device, the information provided by the user, the analyzing including:
      identifying one or more keywords of the information provided by the user;
      comparing the one or more keywords with a keyword library; the keyword library indicating computer-related services; and
      based on the comparing, identifying a particular computer-related service;
   providing, by the computing device, a function interface of the particular computer related service for display on the user interface;
   determining that the one or more keywords of the information provided by the user includes one or more numeric characters having an associated numerical value amount; and
   adding a random numeric character not included with the numeric characters associated with the one or more keywords to a designated region in the function interface and adding at least one of the one or more numeric characters having the associated numerical value to a pull-down menu corresponding to the designated region.

2. The computer-implemented method of claim 1, wherein the application includes a chat-interface based application, and the information provided by the user includes textual data.

3. The computer-implemented method of claim 1, further comprising, after providing the function interface of the particular computer-related service for display on the user interface, receiving, by the computing device, an input signal indicating whether the function interface matches the information provided by the user.

4. The computer-implemented method of claim 1, wherein analyzing the information further includes applying a distinguishing feature to the one or more keywords for display by the application through the user interface.

5. The computer-implemented method of claim 4, further comprising receiving, in response to applying the distinguishing feature, user selection of the one or more keywords to indicate the particular computer-related service.

6. The computer-implemented method of claim 1, further comprising inserting the one or more keywords into the function interface.

7. The computer-implemented method of claim 1, wherein at least one of the one or more keywords comprises a preset keyword related to a payment service or a preset designated-type character, and the designated-type character comprises the one or more numeric characters.

8. A non-transitory, computer-readable medium storing one or more instructions executable by a computer system to perform operations comprising:
   providing, by a computing device, a user interface for display, the user interface providing a graphical display of an application executable by the computing device;
   receiving, by the computing device, information provided by a user to the application through the user interface;
   analyzing, by the computing device, the information provided by the user, the analyzing including:
      identifying one or more keywords of the information provided by the user;
      comparing the one or more keywords with a keyword library, the keyword library indicating computer-related services; and
      based on the comparing, identifying a particular computer-related service;
   providing, by the computing device, a function interface of the particular computer-related service for display on the user interface;
   determining whether the one or more keywords of the information provided by the user includes one or more numeric characters having an associated numerical value amount;
   in response to determining whether the information provided by the user includes one or more numeric characters having an associated numerical value amount, determining whether the numerical value amount exceeds a preset threshold amount associated with the particular computer-related service;
   in response to determining whether the numeric value amount exceeds the preset threshold amount, providing a password input function interface with the function interface of the particular computer-related service for display on the user interface; and
   adding one of the one or more numeric characters to a designated region in the function interface and adding all remaining numeric characters of the one or more numeric characters to a pull-down menu corresponding to the designated region.

9. The computer-readable medium of claim 8, wherein the application includes a chat-interface based application, and the information provided by the user includes textual data.

10. The computer-readable medium of claim 8, further comprising one or more instructions to, after providing the function interface of the particular computer-related service for display on the user interface, receive, by the computing device, an input signal indicating whether the function interface matches the information provided by the user.

11. The computer-readable medium of claim 8, wherein analyzing the information further includes applying a distinguishing feature to the one or more keywords for display by the application through the user interface.

12. The computer-readable medium of claim 11, further comprising one or more instructions to receive, in response to applying the distinguishing feature, user selection of the one or more keywords to indicate the particular computer-related service.

13. The computer-readable medium of claim 8, further comprising one or more instructions to, insert the one or more keywords into the function interface.

14. The computer-readable medium of claim 8, wherein at least one of the one or more keywords comprises a preset keyword related to a payment service or a preset designated-type character, and the designated-type character comprises the one or more numeric characters.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:

providing, by a computing device, a user interface for display, the user interface providing a graphical display of an application executable by the computing device;

receiving, by the computing device, information provided by a user to the application through the user interface;

analyzing, by the computing device, the information provided by the user, the analyzing including:
  identifying one or more keywords of the information provided by the user;
  comparing the one or more keywords with a keyword library, the keyword library indicating computer-related services; and
  based on the comparing, identifying a particular computer-related service;

providing, by the computing device, a function interface of the particular computer-related service for display on the user interface;

determining whether the one or more keywords of the information provided by the user includes one or more numeric characters having an associated numerical value amount;

in response to determining whether the information provided by the user includes one or more numeric characters having an associated numerical value amount, determining whether the numerical value amount exceeds a preset threshold amount associated with the particular computer-related service;

in response to determining whether the numeric value amount exceeds the preset threshold amount, providing a password input function interface with the function interface of the particular computer-related service for display on the user interface; and adding one of the one or more numeric characters to a designated region in the function interface and adding all remaining numeric characters of the one or more numeric characters to a pull-down menu corresponding to the designated region.

16. The computer-implemented system of claim 15, wherein the application includes a chat-interface based application, and the information provided by the user includes textual data.

17. The computer-implemented system of claim 15, further comprising one or more instructions to, after providing the function interface of the particular computer-related service for display on the user interface, receive, by the computing device, an input signal indicating whether the function interface matches the information provided by the user.

18. The computer-implemented system of claim 15, wherein analyzing the information further includes applying a distinguishing feature to the one or more keywords for display by the application through the user interface.

19. The computer-implemented system of claim 18, further comprising one or more instructions to receive, in response to applying the distinguishing feature, user selection of the one or more keywords to indicate the particular computer-related service.

20. The computer-implemented system of claim 15, further comprising one or more instructions to insert the one or more keywords into the function interface.

* * * * *